Patented July 1, 1947

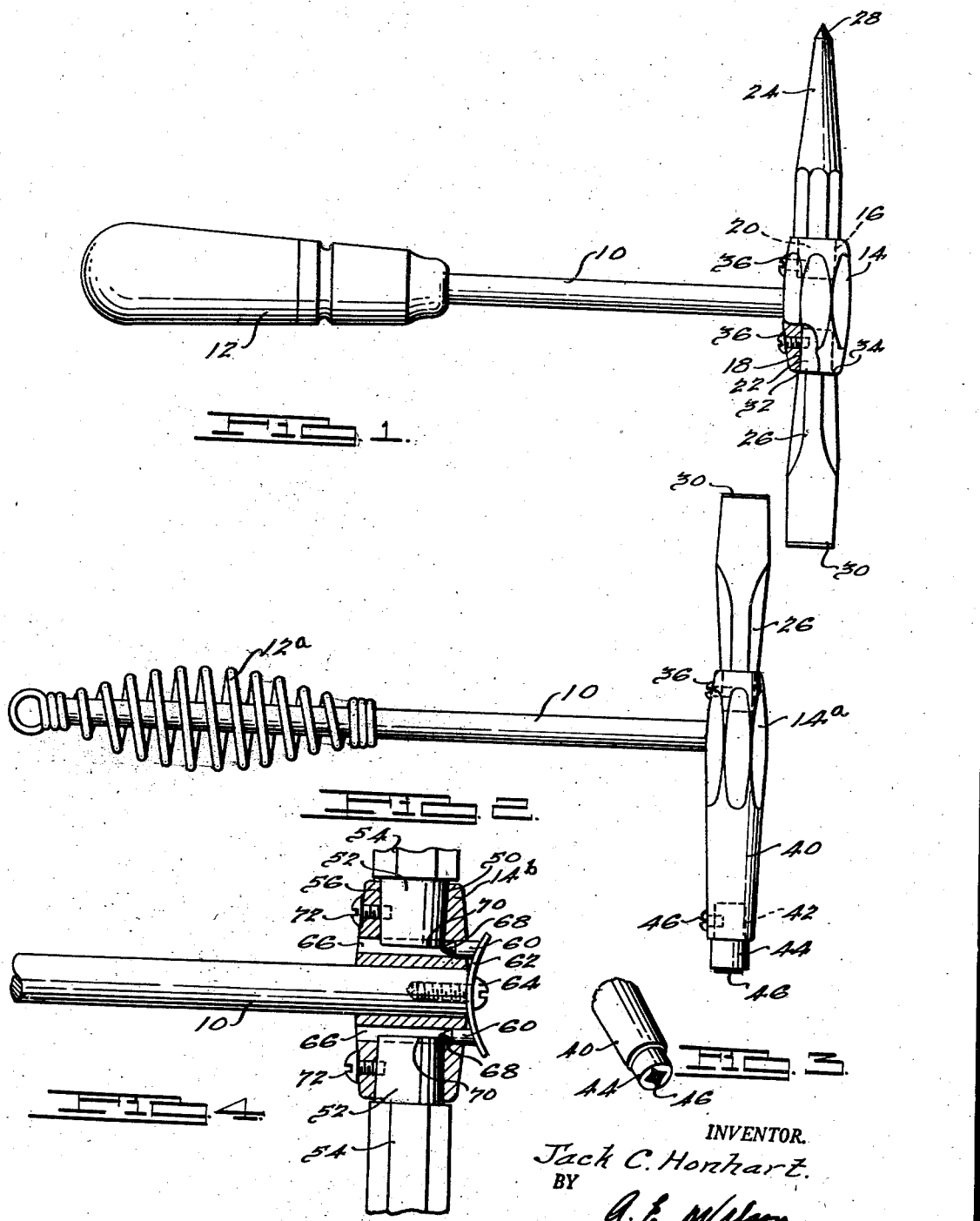

2,423,189

UNITED STATES PATENT OFFICE 2,423,189

HAMMER TYPE WELD CLEANING TOOL
HAVING ATTACHED BIT REMOVERS

Jack C. Honhart, Detroit, Mich.

Application September 10, 1943, Serial No. 501,816

1 Claim. (Cl. 7—8)

This invention relates to weld cleaning tools and more particularly to a tool having interchangeable chipping, cutting and marking bits.

In the art of welding, a glazed crust forms on the welded surface by contact of the air as the metal cools. In order to produce satisfactory welds it is necessary that this glazed crust of slag or scale be removed to expose fresh metal for any ensuing welding operations. It is customary to remove this oxidized coating or scale by means of a chipping tool to crack or break through the encrusted surface formed over the weld. Cleaning tools heretofore used for this purpose have embodied a cutting or chipping member carried by a handle. When the cutting or chipping portion of the tool became worn to such an extent that it was impractical to sharpen it for further use, the entire tool had to be discarded whereupon considerable waste resulted.

An object of this invention is to provide an improved weld cleaning device having a chipping or cutter carrying head adapted to selectively receive interchangeable chipping, cutting or marking members of various types.

A further object is to provide a tool wherein new cutting, chipping or marking elements may be readily substituted for corresponding elements worn in service.

Another object of the invention resides in the provision of a well balanced welding slag or scale removing device having replaceable cutting elements thereby minimizing the cost of maintaining such devices in operative condition.

Another object of the invention is to provide a cleaning tool having novel releasing mechanism between removable chipping or cutting elements and a handle member.

Still a further object resides in the provision of an improved cleaning tool having a chisel type cutting member adapted to be detachably connected to a tool carrying member to dispose the cutting blade at any desired angle.

Other objects and advantages of this invention will be apparent from the following detailed description considered in connection with the accompanying drawings, submitted for purposes of illustration only and not intended to define the scope of the invention, reference being had for that purpose to the subjoined claim.

In the drawings wherein similar reference characters refer to similar parts throughout the several views:

Fig. 1 is a side elevation, partly in section, of a device embodying the present invention.

Fig. 2 is a side elevation of a modified form of the invention.

Fig. 3 is a fragmentary perspective view of a portion of the tool illustrated in Fig. 2 showing the marking number.

Fig. 4 is a sectional view of a still further modified form of the invention illustrating an improved method of releasing chipping or cutting elements from a carrying member.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the embodiment of the invention illustrated in Fig. 1 it will be observed that the cleaning tool comprises a handle 10 having a hand grip portion 12 shown in Fig. 1 as being of a non-metallic construction, and shown as 12a in Fig. 2 as being of coil metal construction. The end of the handle 10 remote from the hand grip portion 12 preferably projects into an aperture formed in a cutter carrying head 14 and is secured therein in any desired manner as by a welding operation.

The cutter carrying head 14 is provided with laterally extended cylinders 16 and 18 to receive shanks 20 and 22 of chipping or cutting tools 24 and 26. The tool 24 is illustrated as provided with a punch point 28, and the tool 26 is provided with a chisel shaped cutting blade 30. It will be apparent that chipping or cutting members having any desired contour or shape may be employed.

The cylinders 16 and 18 formed in the cutter carrying member 14 preferably have straight side walls and the shanks 20 and 22 of the cutting members 24 and 26 have straight side walls, preferably a few thousandths of an inch larger than the bore diameter of the cylinders so as to form a press fit therein to securely hold the cutting or chipping members in place in the head 14. The cutting tools 24 and 26 are formed with radially extended flanges 32 positioned to overlie the edges 34 of the head 14 adjacent the cylinders 16 and 18 to limit inward movement of the cutting members relative to the head 14, and to provide a seat, possibly cooperating with the base of the cutter shank and the bottom of the cylinders formed in the head 14 to support the cutting members. If desired locking screws 36 threaded through the walls of the cutter carrying head 14 may project into detents formed in the shanks 20 and 22 of the cutting members to guard against undesired separation of the cutter members from the head 14.

When one of the cutter members 24 or 26 becomes worn to a point that further sharpening is impractical, it may be removed from the cutter carrying head 14 and a new chipping or cutting tool inserted therein. It is thus possible to replace worn-out chipping or cutting members economically because it is only necessary to replace the worn element and it is therefore unnecessary to discard the entire tool.

The embodiment of the invention illustrated in Fig. 2 is similar in many respects to that illustrated in Fig. 1. It will be noted that the cutter carrying head 14a is provided with an elongated shank 40 projecting to one side of the handle 10 and having a cylindrical aperture 42 formed in the end thereof. A stencil carrying member 44 having a suitable marking symbol 46 positioned thereon may be removably positioned in the cylinder 42 and secured therein in any desired manner as by a locking screw 46.

The extended shank 40 is primarily to compensate for the weight of a cutter member and to reduce the necessary size of the marking symbol carrying member and yet maintain the desired degree of balance of the cleaning tool. It will be understood that the proportions of the extended shank relative to the chipping or cutting member 26 may be varied through necessary limits to provide desired balance characteristics. In this embodiment the cutting member 26 may be replaced with members having differently shaped cutting or chipping blades, and the marking symbol carrying member 44 may be replaced by other similar members having different symbols 46 positioned thereon.

In the embodiments illustrated in Figs. 1 and 2 it will be apparent that the cutting surface 30 may be disposed to any desired angular relation relative to the handle 10. Where the locking screw 36 is employed, the shank 22 of the cutting members 24 and 26 may be formed with spaced detents to permit locking the tool in position so that the cutting blade 30 projects at the desired angle relative to the handle 10.

It will be understood that the cutting tools may be secured to the tool receiving head 14 in any desired manner. Fig. 4 illustrates an embodiment of the invention wherein the laterally extended cylinders of the cutter carrying head 14b are provided with tapered surfaces 50, and the shank 52 of the cutting or chipping members 54 are formed with tapered surfaces 56 substantially corresponding with the taper of the surfaces 50 of the cutter carrying head 14b. Where this type of retaining means is employed the shank of the cutting or chipping tool is forced further into the cutter receiving head 14b when the device is used to cut or chip scale from a weld to securely maintain the cutting elements in assembled relation with the head. The taper between the shank 52 and the cylinder 50 may correspond with the so-called "Morse" taper or may vary therefrom as desired.

Manually operable means may be provided to readily release the cutting members 54 from the cutter carrying head 14b. One desirable form of such releasing means comprises spaced drift pins 60 carried by a spring clip 62 secured to the end of the handle 10 by means of a screw 64. The spaced drift pins 60 are slidably mounted in longitudinally extended drift pin receiving apertures 66 formed in the head 14b and are provided with tapered ends 68 adapted to underlie the base 70 of the shank 52 of the cutter member 54. To release one of the cutter members 54 from the cutter carrying head 14b, it is only necessary to strike one of the pins 60 carried by the spring 62 thereby forcing the tapered end 68 of the pin inwardly in the aperture 66 whereupon the tapered inner end 68 of the pin will exert a wedging force on the base 70 of the shank 52 to separate the cutter member from the head 14b.

If desired locking means such as screws 72 projecting through the walls of the cutter carrying head 14b and extending into detents formed in the shanks 52 of the cutter members 54 may be provided to prevent undesired separation of the cutting member from the head. It is thus possible to quickly remove a chipping or cutting member and replace it with a differently shaped tool more adaptable for use in a particular operation required, or to replace it with a new chipping or cutting tool when the used tool is worn out.

It will be apparent that if desired a symbol carrying member such for example as the member 44 illustrated in Fig. 2 may be provided with a tapered shank and have an elongated body portion to adapt the marking symbol for use in the tool receiving head illustrated in Fig. 4 or Fig. 2 and to maintain the desired balance of the device.

I claim:

A cleaning tool for welds and the like, comprising a handle, a head fixed to one end of the handle and having two oppositely directed tapered openings, instruments having tapered shanks interchangeably seated within said openings, said head being formed with bores extending parallel to the handle and intersecting said openings adjacent their bases, a leaf spring having its intermediate portion secured between said bores and having its ends overlying said bores, two drift pins each secured to an end of the spring and having a tapered end projecting into one of the bores and movable upon deflection of the spring into contact with the shank of the instrument seated in the corresponding bore to move the shank outwardly of the opening, said leaf spring being arranged substantially parallel with the head.

JACK C. HONHART.

REFERENCES CITED

The following references are of record in the file of this patent:

UNITED STATES PATENTS

| Number | Name | Date |
|---|---|---|
| 810,987 | Spicer | Jan. 30, 1906 |
| 1,620,262 | Klaboe | Mar. 8, 1927 |
| 1,259,904 | Pennington | Mar. 19, 1918 |
| 1,388,872 | McElhaney | Aug. 30, 1921 |
| 378,341 | Snee | Feb. 21, 1888 |
| 723,764 | Vick | Mar. 24, 1903 |
| 874,730 | Bolderl | Dec. 24, 1907 |
| 1,496,013 | Minick | June 3, 1924 |
| 983,859 | Gottvald | Feb. 7, 1911 |
| 1,972,540 | Teate | Sept. 4, 1934 |
| 486,732 | Morrison et al. | Nov. 22, 1892 |

FOREIGN PATENTS

| Number | Country | Date |
|---|---|---|
| 447,445 | France | Oct. 28, 1912 |
| 4,318 | Great Britain | Feb. 28, 1901 |